US012801735B2

(12) United States Patent
Tejada

(10) Patent No.: US 12,801,735 B2
(45) Date of Patent: Nov. 17, 2026

(54) SYSTEMS AND METHODS FOR AI-DRIVEN DATA PROTECTION IN CYBERSECURITY

(71) Applicant: Carlos Tejada, Tustin, CA (US)

(72) Inventor: Carlos Tejada, Tustin, CA (US)

( * ) Notice: Subject to any disclaimer, the term of this patent is extended or adjusted under 35 U.S.C. 154(b) by 142 days.

(21) Appl. No.: 19/058,926

(22) Filed: Feb. 20, 2025

(65) Prior Publication Data

US 2026/0244740 A1 Aug. 20, 2026

(51) Int. Cl.
*H04L 29/06* (2006.01)
*G06F 21/31* (2013.01)
*G06F 21/55* (2013.01)

(52) U.S. Cl.
CPC ............ *G06F 21/554* (2013.01); *G06F 21/31* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 12,341,797 | B1 * | 6/2025 | Adamson | G06F 16/9024 |
| 12,495,052 | B1 * | 12/2025 | Godefroid | G06F 16/9024 |
| 12,537,884 | B1 * | 1/2026 | Hall | G06F 16/9024 |
| 12,580,932 | B1 * | 3/2026 | McAleer | G06F 9/5072 |
| 12,580,934 | B1 * | 3/2026 | Adamson | G06F 9/5072 |
| 12,621,324 | B1 * | 5/2026 | Erlingsson | G06F 9/5072 |
| 12,627,687 | B1 * | 5/2026 | Adamson | G06F 9/5072 |
| 2024/0056458 | A1 * | 2/2024 | Lee | G06N 3/0475 |
| 2026/0030360 | A1 * | 1/2026 | Siekman | G06F 21/577 |
| 2026/0111541 | A1 * | 4/2026 | Vörös | G06F 21/554 |
| 2026/0119650 | A1 * | 4/2026 | Reynolds | G06F 21/554 |
| 2026/0203416 | A1 * | 7/2026 | Silver | G06F 16/2358 |
| 2026/0220260 | A1 * | 7/2026 | Thompson | G06F 21/554 |
| 2026/0244733 | A1 * | 8/2026 | Rao | G06F 21/53 |

OTHER PUBLICATIONS

Wang, Wei et al. Research on Secure Communication Model for Station Based on Multi-Factor Identity Authentication. 2023 IEEE 11th Joint International Information Technology and Artificial Intelligence Conference (ITAIC). https://ieeexplore.ieee.org/stamp/stamp.jsp?tp=&arnumber=10408878 (Year: 2023).*

V.S., Prasanth et al. Machine Learning Based Secure Cardless Financial Transactions Using Multi Factor Authentication. 2025 6th International Conference on Mobile Computing and Sustainable Informatics (ICMCSI). https://ieeexplore.ieee.org/stamp/stamp.jsp?tp=&arnumber=10883580 (Year: 2025).*

Sasikumar, S.; Nagarajan, Sivakumar. Enhancing Cloud Security: A Multi-Factor Authentication and Adaptive Cryptography Approach Using Machine Learning Techniques. IEEE Open Journal of the Computer Society, vol. 6. (Year: 2025).*

* cited by examiner

*Primary Examiner* — Jeremiah L Avery
(74) *Attorney, Agent, or Firm* — The Rapacke Law Group, P.A.; Andrew S. Rapacke; Kenneth F. Brooks

(57) ABSTRACT

A method or product may include implementing multi-factor authentication at an operating system level; monitoring, via an artificial intelligence (AI) model, real-time packet data, one or more data patterns, and one or more endpoints for a threat on a network; and encrypting outbound data on the network in response to detecting the threat via the monitoring.

18 Claims, 4 Drawing Sheets

SYSTEMS AND METHODS FOR AI-DRIVEN DATA PROTECTION IN CYBERSECURITY

TECHNICAL FIELD

The embodiments generally relate to the technical field of multi-factor authentication (MFA) and AI-based network traffic and perform real-time packet analysis, data pattern tracking, and endpoints monitoring.

BACKGROUND

MFA is a security mechanism that enhances user authentication by requiring multiple independent credentials for identity verification. Unlike conventional single-factor authentication, which may rely solely on a password, MFA uses two or more distinct factors to confirm a user's identity. MFA's layered approach may reduce the risk of unauthorized access, even if one factor is compromised.

Conventional systems for MFA at a may be configured to integrate authentication mechanisms directly into a computer operating system's kernel. Embedding MFA at the enhances system security by ensuring that authentication processes are deeply integrated and less vulnerable to tampering.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

In one aspect, a cybersecurity solution is disclosed that prevents unauthorized data access and ransomware. The system uses multi-factor authentication (MFA) at the operating system level.

The system also uses AI to monitor network activity, analyze data in real time, and track patterns. If a threat is detected, the AI alerts a security device to automatically encrypt outgoing data, making stolen information unusable. In embodiments, the system requires verification before important actions are permitted and encrypts data during suspicious activity, effectively preventing data breaches.

In one aspect, variations of the disclosed system may include an MFA module configured to automatically encrypt outbound data from an organization. The MFA module is configured to implement MFA at an operating system level, which requires server-generated verification codes for software installations and modifications.

In one aspect, variations of the disclosed system may include an AI module configured to monitor network traffic and perform real-time packet analysis, data pattern tracking, and endpoints monitoring to detect network threats. Upon detecting a threat, the AI module is configured to instruct the MFA module to encrypt outbound data from an organization.

In one aspect, variations of the disclosed system may include a zero-trust module configured to monitor system data transfer and ports to detect when data is leaving an organization and automatically encrypt any data exiting an organization via the MFA module.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
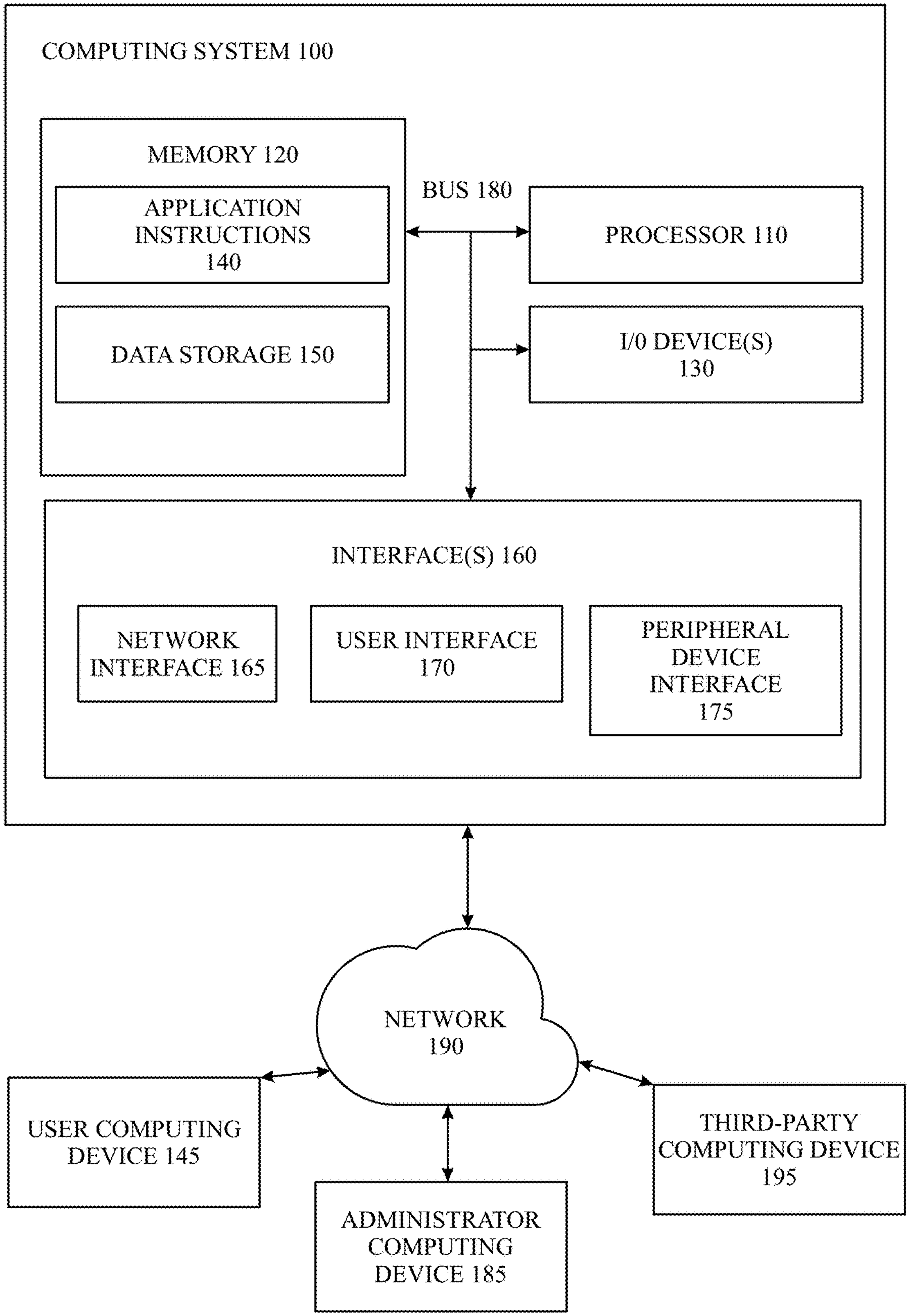
FIG. 1 illustrates a system architecture diagram, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed system features a cybersecurity solution designed to prevent unauthorized data access and ransomware execution through operating system level multi-factor authentication (MFA). This system implements MFA directly within the operating system, requiring server-generated verification codes for software installations and modifications. These verification codes are distributed across various random servers and necessitate a physical device located in the server room to receive the codes.

Additionally, the system employs AI monitoring for real-time packet analysis, data pattern tracking, and endpoint monitoring. Upon detecting threats, the AI communicates with a security appliance to automatically trigger the encryption of outbound data, rendering stolen information unusable.

Integrating MFA at the operating system level alongside AI-driven monitoring marks a significant technical advancement. By mandating verification before sensitive operations and automatically encrypting data during suspicious activities, this system effectively prevents successful data breaches through multiple layers of security. Unlike current solutions that primarily focus on malware removal, this innovation prevents the execution of malicious code through its operating system authentication mechanism.

Various implementations of the invention involve the technical field of operating system level MFA and AI-based network traffic and perform real-time packet analysis, data pattern tracking, and endpoints monitoring, and are therefore necessarily rooted in computer technology. For example, the steps of implementing multi-factor authentication at a operating system level; monitoring, via an artificial intelligence (AI) model, real-time packet data, one or more data patterns, and one or more endpoints for a threat on a network; and encrypting outbound data on the network in response to detecting the threat via the monitoring are inherently computer-based and cannot be performed in the human mind. The present invention amounts to more than merely implementing the generic computer as a tool to gather, analyze, and output data because the steps of the present method, system, or product improve the security of computer networks by preventing malware attacks in contrast to detecting them after they have occurred. Conventional malware prevention tools focus on malware removal, while the disclosed system blocks malicious code execution through its operating system level MFA. Additionally, the steps of the present invention would be impossible to accomplish on pen and paper due to the volume of data being communicated and received over a network in real-time. In particular, the speed at which the steps of the present invention occur to effectuate the disclosed method, system, or product would involve large-scale, continuous wireless communication of such data. That is, the steps of the present method, system, or product are impossible to accomplish on pen and paper, cannot be accomplished as a method of organizing human activity, and amount to significantly more than merely gathering, analyzing, and outputting data.

Implementations of the present invention include implementing (executing, running, or deploying) one or more artificial intelligence models on a computing device wherein the computing device executes the artificial intelligence model's algorithms and mathematical functions on computer hardware using machine learning libraries. The computing device implements the artificial intelligence model when it performs tasks like training, making predictions, applying the model to data, decision-making, classification, or generating outputs based on inputs. In particular, the speed at which an artificial intelligence model occur to analyzes and transforms data to effectuate the disclosed method, system, or product would involve large-scale, continuous transformation of such data. As such, the present invention would be impossible to accomplish on pen and paper or in the human mind due to the volume of data being analyzed and transformed by the artificial intelligence model.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computer system 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C #, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Ruby on Rails or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized by a user to interact with the various functionalities of the system. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
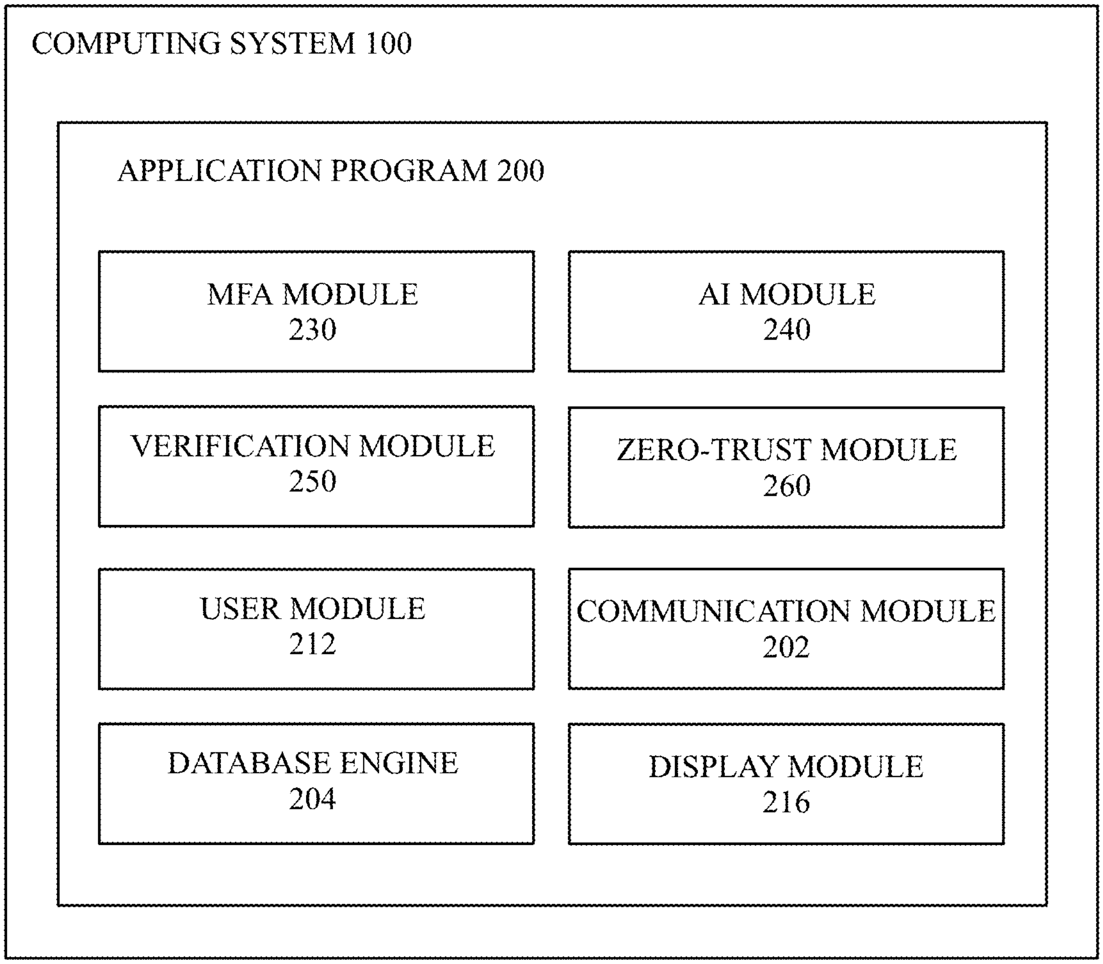
FIG. 2 illustrates an application program and modules in communication with the computing system, according to some embodiments.

FIG. 2 illustrates an example computer architecture for the application program 200 operated via the computing system 100. The computer system 100 comprises several modules and engines configured to execute the functionalities of the application program 200, and a database engine 204 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of an MFA module 230, an AI module 240, a verification module 250, a zero-trust module 260, a communication module 202, a database engine 204, a user module 212, and a display module 216.

In some embodiments, the MFA module 230 is configured to enforce MFA as part of the initial system boot or user login sequence. The MFA module 230 is configured to implement MFA at an operating system level, which requires server-generated verification codes for software installations and modifications. The MFA module 230 is configured to enhance system security by requiring users to provide multiple authentication factors before granting access to a computing device or network. MFA may involve combining something the user knows (e.g., a password), something the user has (e.g., a security token or smartphone), and something the user is (e.g., biometric data such as fingerprints or facial recognition) as part of a multi-factor authentication process. The MFA module 230 may be configured to cooperate with the operating system's authentication settings, integrating with enterprise-grade identity management solutions, and ensuring compatibility with external MFA devices, application programming interfaces, or applications.

In some embodiments, the AI module 240 is configured to monitor real-time and historical network traffic and perform real-time packet analysis, data pattern tracking, executable requests, and endpoint monitoring to detect network threats. The AI module 240 is configured to authenticate, via the MFA module 230, requests before execution while also instructing a security appliance to encrypt outbound data from an organization via an encryption method such as, but not limited to, symmetric encryption, asymmetric encryption, hybrid encryption, etc. The AI module 240 may be configured to implement an unsupervised machine learning (ML) model, a supervised learning model, a semi-supervised learning model, a reinforcement learning model, a time-series analysis model, or a hybrid model. In embodiments, the AI module 240 may include a supervised learning model that is a logistic regression model configured to identify malicious network traffic based on network packet headers and the endpoints of network traffic communication, protocols, directions, and metadata. In embodiments, the AI module 240 performs anomaly detection techniques such as clustering or autoencoding to identify abnormal patterns or outlier detection that may indicate malware threats.

In some embodiments, the verification module 250 is configured to generate verification codes for the MFA module 230, wherein codes are distributed across random servers and require a physical device in a server room for code reception. The MFA module 230 may generate verification codes by, for example, time-based one-time password generation, push notification, hash-based message authentication code, email-based one-time password, short-message-system-based password, etc.

In some embodiments, the zero-trust module 260 is configured to require verification for all executable requests in operative cooperation with the MFA module 230. That is, the zero-trust module 260 is configured to require MFA for all executable requests performed on a specific network, machine, or group of machines to further facilitate secure use or the specific network, machine, or group of machines.

In some embodiments, the communication module 202 is configured for receiving, processing, and transmitting a user command and/or one or more data streams. In such embodiments, the communication module 202 performs communication functions between various devices, including the user computing device 145 of FIG. 1, the administrator computing device 185 of FIG. 1, and a third-party computing device 195 of FIG. 1. In some embodiments, the communication module 202 is configured to allow one or more users of the system, including a third-party, to communicate with one another. In some embodiments, the communications module 202 is configured to maintain one or more communication sessions with one or more servers, the administrative computing device 185 of FIG. 1, and/or one or more third-party computing device(s) 195 of FIG. 1. In some embodiments, the communication module 202 may allow users and administrators to communicate with one another.

In some embodiments, a database engine 204 is configured to facilitate the storage, management, and retrieval of data to and from one or more storage mediums, such as the one or more internal databases described herein. In some embodiments, the database engine 204 is coupled to an external storage system. In some embodiments, the database engine 204 is configured to apply changes to one or more databases. In some embodiments, the database engine 204 comprises a search engine component for searching through thousands of data sources stored in different locations.

The user module 212 may store user preferences including the user account information, historical usage data, user personal information, and the like. The user module 212 may facilitate the creation of user's profiles for users, administrators, and others.

In some embodiments, the display module 216 is configured to display one or more graphic user interfaces, including, e.g., one or more user interfaces. In some embodiments, the display module 216 is configured to temporarily generate and display various pieces of information in response to one or more commands or operations. The various pieces of information or data generated and displayed may be transiently generated and displayed, and the displayed content in the display module 216 may be refreshed and replaced with different content upon the receipt of different commands or operations in some embodiments. In such embodiments, the various pieces of information generated and displayed in a display module 216 may not be persistently stored. The display module 216 displays information, notifications, and alerts to the user device which can be viewed and acknowledged by the user.

Figure 3:
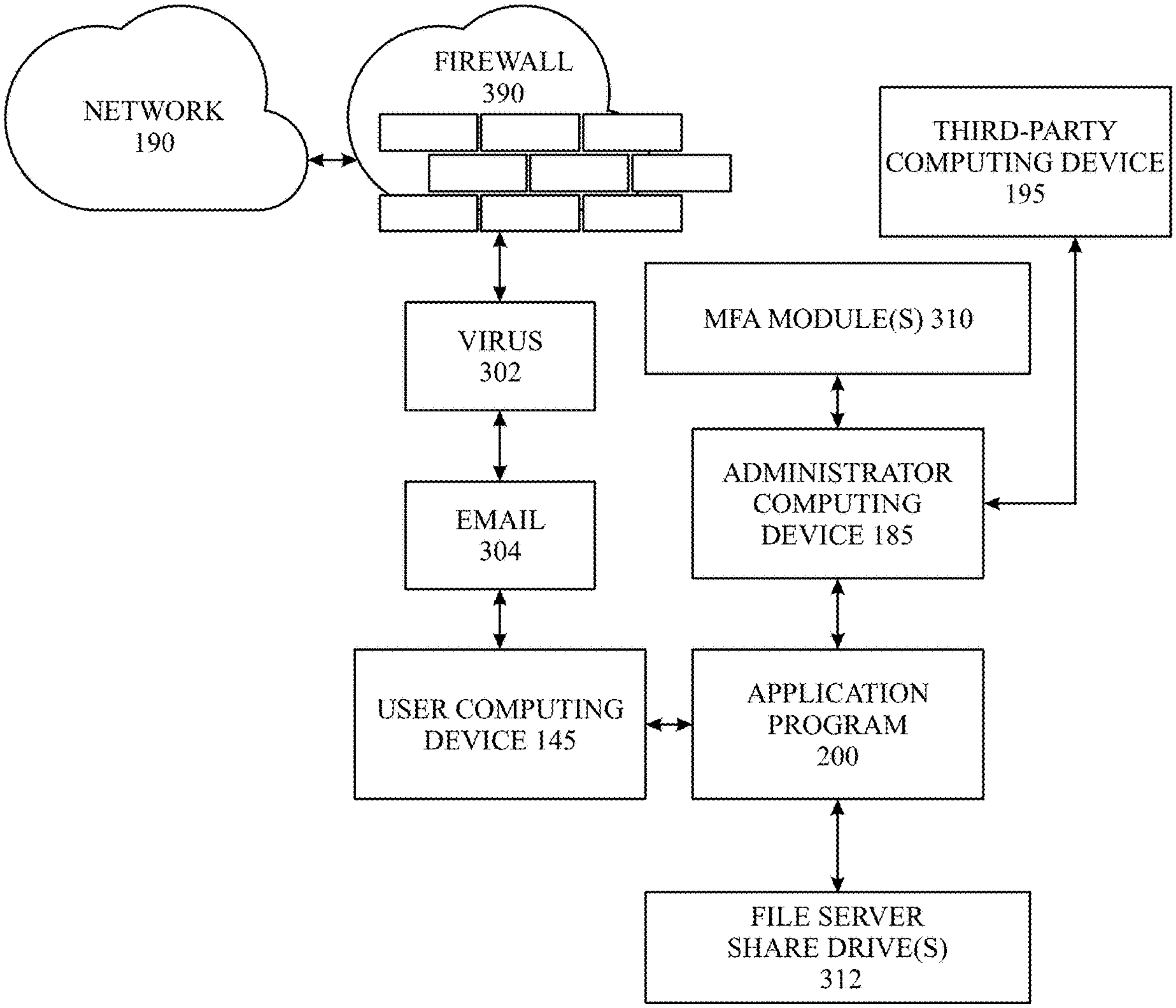
FIG. 3 illustrates a block diagram of a system for AI-driven data protection in cybersecurity, according to some embodiments.

FIG. 3 illustrates a block diagram of a system for AI-driven data protection in cybersecurity, including the application program 200 of FIG. 2, which may be in operable communication with the user computing device 145 and administrator computing device 185 of FIG. 2. In practice and in use, a user may be exposed to malware, ransomware, or other security threat, collectively referred to as "virus" 304, which attempts to access or interact with the user computing device 145, typically over the network 190 of FIG. 1, by bypassing, for example, a firewall 390 as an attachment within, for example, and inconspicuous email 304. The application program 200 is configured to monitor real-time and historical network traffic (e.g. email 304) and perform real-time packet analysis, data pattern tracking, executable requests, and endpoint monitoring to detect network threats (e.g. virus 302) via the AI module 340 of FIG. 2 operating via MFA server(s) 310 operated in conjunction with the administrator computing device 185. In embodiments, the virus 302 may be configured to attempt to execute a hostile program on the user computing device 145, administrator computing device 185, or file server share drive(s) 312. Execution requests must first be authenticated, via the MFA module 230 generating one or more random MFA codes, before execution may occur. Simultaneously, the MFA module 230 instructs a security appliance to encrypt outbound data from an organization via an encryption method.

Figure 4:
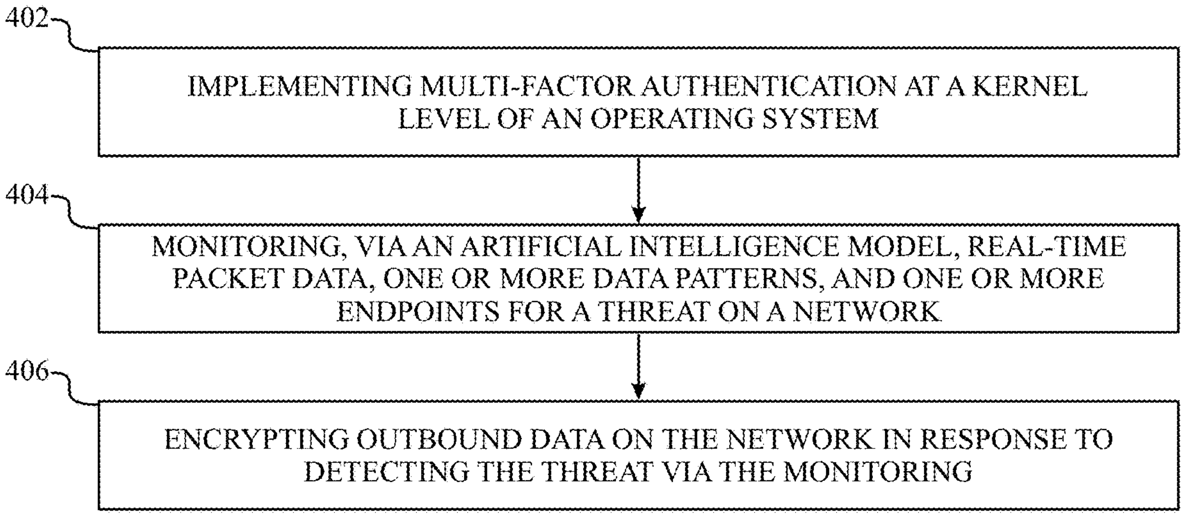
FIG. 4 illustrates a method for AI-driven data protection in cybersecurity, according to some embodiments.

FIG. 4 illustrates a method for AI-driven data protection in cybersecurity. The method may include, in step 402, implementing, via the MFA module 230 of FIG. 2, multi-factor authentication at an operating system level. Step 404 may include monitoring, via AI module 240 of FIG. 2, real-time packet data, one or more data patterns, and one or more endpoints for a threat on a network. Step 404 may include, encrypting outbound data on the network, via AI module 240 of FIG. 2, in response to detecting the threat via the monitoring.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

I claim:

1. A computer-implemented method comprising:

implementing, via a computing device, multi-factor authentication at an operating system level;

monitoring, via the computing device implementing an artificial intelligence (AI) model, real-time packet data, one or more data patterns, and one or more endpoints for a threat on a network; and encrypting outbound data on the network, via the computing device, in response to detecting the threat via the monitoring.

2. The computer-implemented method of claim 1, further comprising generating one or more multi-factor authentication codes.

3. The computer-implemented method of claim 2, wherein the method is a zero-trust method requiring multi-factor authentication of all executable requests.

4. The computer-implemented method of claim 1, wherein the AI model is a supervised learning model.

5. The computer-implemented method of claim 4, wherein the supervised learning model is a logistic regression model configured to identify suspicious network traffic based on network packet headers and the endpoints of network traffic communication, protocols, directions, and metadata.

6. The computer-implemented method of claim 1, wherein the AI model is at least one of an unsupervised learning model, a semi-supervised learning model, a reinforcement learning model, a time-series analysis model, or a hybrid model.

7. The computer-implemented method of claim 1, wherein the monitoring further comprises tracing an origin of the threat on the network.

8. The computer-implemented method of claim 1, wherein the monitoring further comprises identifying spikes in data transfer activity outside of a preidentified threshold.

9. The computer-implemented method of claim 1, further comprising:

adjusting the monitoring based on historical packet data, historical data patterns, and historical endpoint data.

10. The computer-implemented method of claim 1, further comprising:

generating an alert notification associated with the encrypting the outbound data on the network.

11. The computer-implemented method of claim 1, further comprising:

capturing an internet protocol (IP) address and a media access control (MAC) address associated with the outbound data on the network.

12. A system comprising:

at least one computing device in operable communication with a network;

an application server in operable communication with the at least one computing device over the network, the application server configured to host an application program configured to:

implement multi-factor authentication policy;

monitor, via an artificial intelligence (AI) model, real-time packet data, one or more data patterns, and one or more endpoints for a threat on a network comprising identifying spikes in data transfer activity outside of a preidentified threshold;

adjust the monitoring based on historical packet data, historical data patterns, and historical endpoint data;

encrypt outbound data on the network in response to detecting the suspicious activity via the monitoring;

generate one or more multi-factor authentication codes; and capture an internet protocol (IP) address and a media access control (MAC) address associated with the outbound data on the network; and generate an alert notification associated with the encrypting the outbound data on the network.

13. The system of claim 12, wherein the multi-factor authentication policy requires multi-factor authentication of all executable requests.

14. The system of claim 13, wherein the AI model is a supervised learning model.

15. The system of claim 14, wherein the supervised learning model is a logistic regression model configured to identify malicious network traffic based on network packet headers and the endpoints of network traffic communication, protocols, directions, and metadata.

16. The system of claim 13, wherein the AI model is at least one of an unsupervised learning model, a semi-supervised learning model, a reinforcement learning model, a time-series analysis model, or a hybrid model.

17. The system of claim 13, wherein the monitoring further comprises tracing an origin of the threat on the network.

18. A software product comprising at least one computer readable storage media having application instructions collectively stored on the at least one computer readable storage media, the application instructions executable to:

implement multi-factor authentication at a operating system level;

monitor, via an artificial intelligence (AI) model, real-time packet data, one or more data patterns, and one or more endpoints for a threat on a network comprising identifying spikes in data transfer activity outside of a preidentified threshold;

encrypt outbound data on the network in response to detecting the threat via the monitoring;

generate one or more server-side authentication codes for the multi-factor authentication; and distribute the server-side authentication codes across one or more physical devices associated with one or more servers; and capture an internet protocol (IP) address and a media access control (MAC) address associated with the outbound data on the network.

* * * * *